United States Patent [19]

Beckwith, Jr.

[11] Patent Number: 4,884,889
[45] Date of Patent: Dec. 5, 1989

[54] CALIBRATION SYSTEM FOR COORDINATE MEASURING MACHINE

[75] Inventor: Walter L. Beckwith, Jr., Warwick, R.I.

[73] Assignee: Brown & Sharpe Manufacturing Company, North Kingstown, R.I.

[21] Appl. No.: 122,771

[22] Filed: Nov. 19, 1987

[51] Int. Cl.$^4$ ............................................. G01B 11/00
[52] U.S. Cl. ................................... 356/375; 33/1 M; 33/503; 356/373
[58] Field of Search ............... 356/373, 375, 356, 358; 250/561; 33/1 M, 502, 503, 504

[56] References Cited

U.S. PATENT DOCUMENTS

| | | | |
|---|---|---|---|
| 2,924,768 | 2/1960 | Farrand et al. | 318/480 |
| 3,551,055 | 12/1970 | Chitayat . | |
| 3,622,244 | 11/1971 | Chitayat . | |
| 3,715,599 | 2/1973 | Marcy | 250/231 R |
| 3,765,772 | 10/1973 | Willett . | |
| 3,790,284 | 2/1974 | Baldwin . | |
| 3,884,580 | 5/1975 | Webster et al. . | |
| 4,215,938 | 8/1980 | Farrand et al. | 356/358 |
| 4,261,107 | 4/1981 | Coleman et al. | 33/174 L |
| 4,276,698 | 7/1981 | Dore et al. | 33/503 |
| 4,500,200 | 2/1985 | Kleinhans | 356/152 |

OTHER PUBLICATIONS

"Calibration of a Machine Tool", Laser Measurement System, Application Note 156-4, Hewlett-Packard.

Primary Examiner—F. L. Evans
Attorney, Agent, or Firm—Wolf, Greenfield & Sacks

[57] ABSTRACT

A calibration system for measuring the parametric errors in a coordinate measuring machine having a first element and a table which are movable in three dimensions relative to each other. The apparatus comprises a reflector assembly attachable to the first element, a laser measuring assembly attachable to the table for directing a plurality of laser beams at the reflector assembly and for sensing laser beams reflected from the reflector assembly and generating displacement, straightness, pitch, yaw and roll error signals, and means for mounting the laser measuring assembly to the table in three different orientations and for mounting the reflector assembly to the first element in three different orientations. In each of the orientations, the reflector assembly and the laser measuring assembly are aligned for measurement of parametric errors at a plurality of selected positions along the direction of the laser beam. The parametric errors along each direction of movement are stored in a computer. When a part is measured with the machine, the total errors are calculated at each measurement point, and the errors are subtracted from the scale readings.

29 Claims, 10 Drawing Sheets

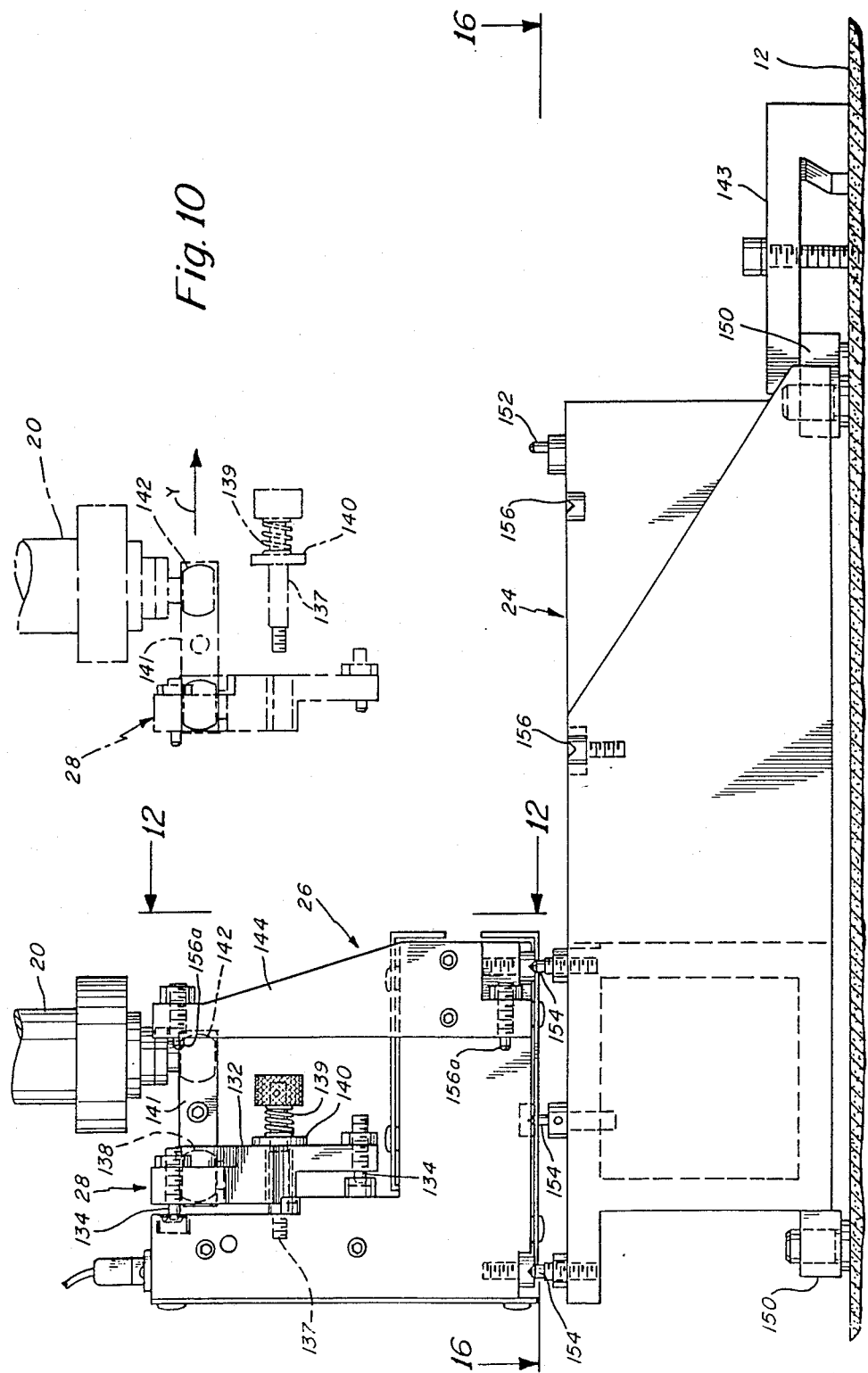

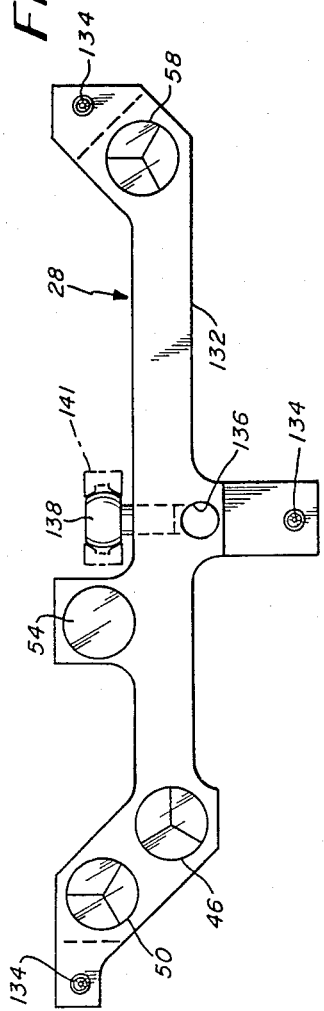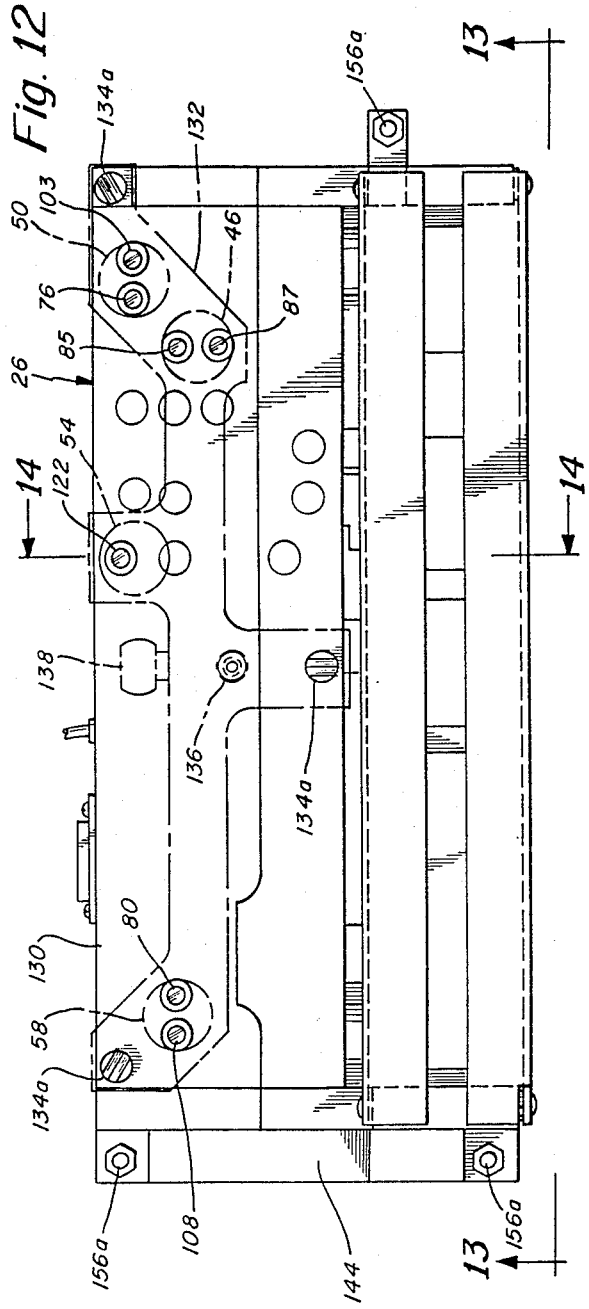

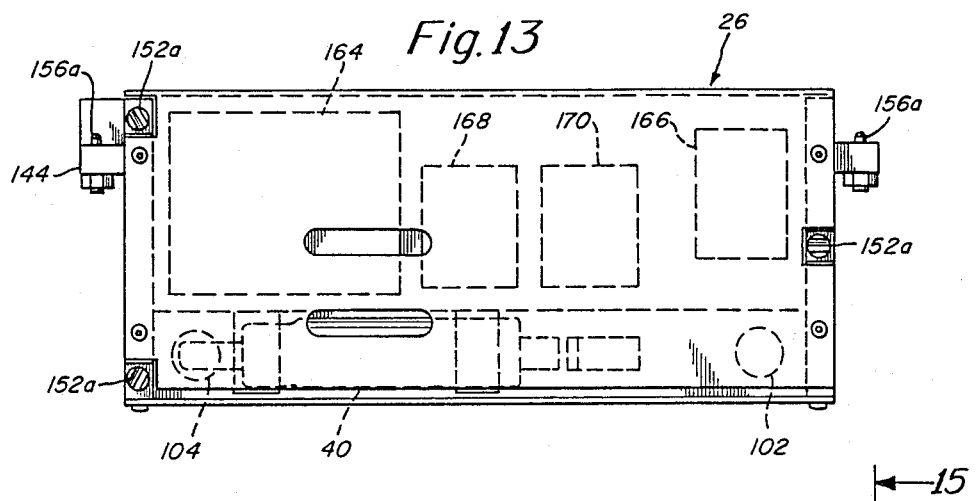
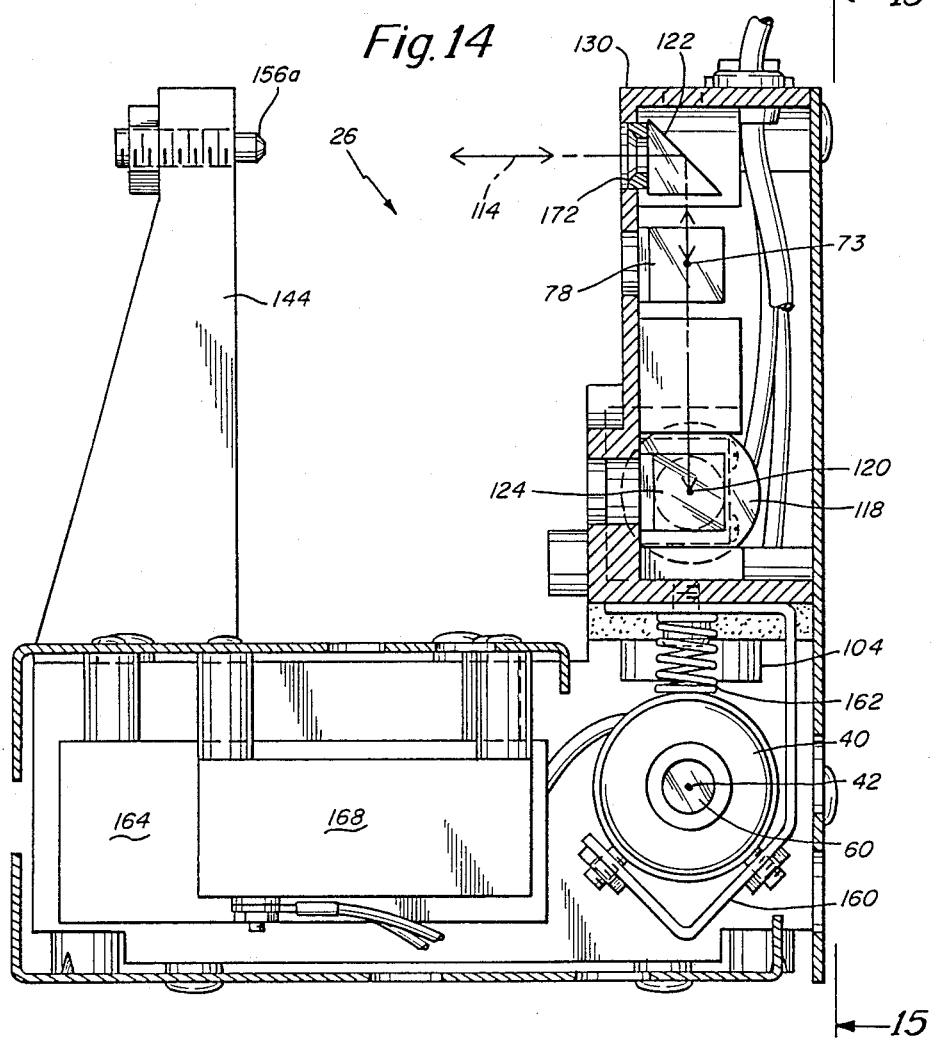

CALIBRATION SYSTEM FOR COORDINATE MEASURING MACHINE

FIELD OF THE INVENTION

This invention relates to coordinate measuring machines and, more particularly, to a system for calibrating coordinate measuring machines to compensate for position-dependent errors in measured coordinate values.

BACKGROUND OF THE INVENTION

Coordinate measuring machines are used for dimensional inspection of workpieces such as machine parts. A workpiece is secured to a fixed table, and a measuring probe is secured to a vertically movable ram which is also movable in a horizontal plane. To measure the position of a point on the workpiece, the probe is brought into contact with the point and the x, y and z measuring scales of the machine are read. To measure a distance between two points, the points are contacted successively, the coordinates of both points are read and distance is calculated from the coordinates. State-of-the-art coordinate measuring machines have refinements such as high resolution measuring systems, electrical contact probes, motor drives, computer controlled drives and computer acquisition and processing of data.

The accuracy of a coordinate measuring machine is limited by inaccuracies in the scales or other measuring systems and by faults in the guideways which establish orthogonality of machine motions. One approach to increasing accuracy is simply to improve the construction techniques and reduce tolerances of the system so that errors are reduced. However, the reduction of errors becomes progressively more expensive as required accuracies increase. Another approach is direct measurement of x, y and z errors at points throughout the machine working volume. This approach is impractical because of the huge amounts of data which must be stored for large machines and because of the time required to measure such data. A third approach is the measurements of errors in parametric form. That is, sets of error parameters are measured, for example, along three mutually orthorgonal axes and stored for future use. The x, y and z errors at any point in the measurement volume are calculated from the parametric errors. The calculated errors are then subtracted from the scale readings to determine actual workpiece coordinates.

The coordinate measuring machine has three sets of guideways which establish probe motion. Ideally, movement along each of these guideways should result only in linear motion and the scale reading would equal the linear displacement. In reality, however, there are scale errors and the guideways are not completely straight or perfectly free from twist. For a real machine, there are six degrees of freedom which produce errors during movement along each guideway. For each direction of movement, there are three linear errors, Dx, Dy and Dz and three rotational errors, Ax, Ay and Az. These six error parameters can be measured at a number of points along each direction of machine movement, resulting in an error matrix with 18 error parameters. From the matrix of 18 error parameters, the error at any point in the measurement volume can be calculated.

Various techniques have been used for the measurement of parametric errors. Laser interferometer techniques are well-known for measuring displacement errors with high accuracy. Dual frequency interferometer techniques have also been utilized for measurement of straightness and roll as disclosed in U.S. Pat. No. 3,790,284, issued Feb. 5, 1974 to Baldwin. A system utilizing partitioned photocells to detect pitch and yaw of a stage is disclosed in U.S. Pat. No. 3,715,599 issued Feb. 6, 1973 to Marcy. A four quadrant angular movement sensor is disclosed in U.S. Pat. No. 3,765,772 issued Oct. 16, 1973 to Willett. One prior art approach to measurement of parametric errors utilizes a Hewlett-Packard 5526A laser measuring system, which is described in "Calibration of a Machine Tool," Hewlett-Packard Laser Measurement System Application Note 156-4. The system is transportable between machines but the machine calibration time is about 40 hours. In addition, a different setup is needed for each measurement and setup errors are difficult to avoid. A system for measuring the six error parameters along each axis of motion of a measuring machine is disclosed in U.S. Pat. No. 4,261,107, issued Apr. 14, 1981 to Coleman et al. The system utilizes interferometric techniques for measuring each of the error parameters and, thus, requires a dual frequency laser to measure displacements perpendicular to the laser beam axis. As a result, the system is complex and expensive. Furthermore, different fixed measurement arrangements are utilized for each of the three axes of motion of the machine, thereby further adding to the complexity and cost of the system.

Since the error parameters associated with a particular machine remain relatively fixed with time, it is desirable to provide a method and apparatus for machine calibration wherein a calibration device can be attached to the machine, the calibration procedure can be performed in a short time and the calibration device can then be removed for use with another machine. Such a calibration system must provide high accuracy error measurement and must be easily attached to the machine and easily detached after use. The calibration procedure can be repeated as necessary through the life of the machine.

It is a general object of the present invention to provide improved coordinate measuring machines.

It is another object of the present invention to provide methods and apparatus for calibrating the position of a movable element relative to a fixed element in a machine.

It is yet another object of the present invention to provide methods and apparatus for improving the accuracy of coordinate measuring machines.

It is still another object of the present invention to provide methods and apparatus for measuring the parametric errors associated with a movable element relative to a fixed element.

It is another object of the present invention to provide a calibration system for a coordinate measuring machine which is easily attachable and detachable from the machine.

It is yet another object of the present invention to provide methods and apparatus for calibrating a coordinate measuring machine.

It is a further object of the present invention to provide methods and apparatus for accurately measuring parametric errors along each of three directions of movement in a coordinate measuring machine.

SUMMARY OF THE INVENTION

According to the present invention, these and other objects and advantages are achieved in apparatus for measuring parametric errors in a machine having a first element and a table which are movable in at least two dimensions relative to each other. The apparatus comprises a reflector assembly attachable to the first element, a laser measuring assembly attachable to the table for directing at least one laser beam at the reflector assembly and for sensing the laser beam reflected from the reflector assembly and generating displacement, straightness, pitch, yaw and roll error signals and means for mounting the laser measuring assembly to the table in different orientations and for mounting the reflector assembly to the first element in different orientations. The reflector assembly and the laser measuring assembly are aligned in each of the orientations so that the outgoing laser beam is reflected by the reflector assembly back to the laser measuring assembly. In each orientation, displacement, straightness, pitch, yaw and roll errors are measured at a plurality of selected positions along the direction of the laser beam.

According to another aspect of the present invention, there is provided a method for measuring parametric position errors in a machine having a first element and a table which are movable in at least two dimensions relative to each other. The method comprises the steps of (a) mounting a reflector assembly to the first element in a first orientation; (b) mounting a laser measuring assembly to the table in a first orientation aligned with the reflector assembly such that at least one laser beam is directed by the measuring assembly at the reflector assembly and is reflected back to the measuring assembly; (c) converting the laser beam reflected back to the measuring assembly to displacement, straightness, pitch, yaw and roll error signals and storing the error signals; (d) moving the first element and the reflector assembly in the direction of the laser beam to a selected new position wherein the reflector assembly is aligned with the laser beam; (e) converting the laser beam reflected back to the measuring assembly to displacement, straightness, pitch, yaw and roll error signals and storing the error signals; (f) repeating steps (d) and (e) for a number of selected new positions in the direction of the laser beam; (g) mounting the reflector assembly to the first element in a second orientation orthogonal to the first orientation; (h) mounting the laser measuring assembly to the table in a second orientation orthogonal to the first orientation and in alignment with the reflector assembly; and (i) repeating steps (c)–(f) for the second orientation.

In a preferred embodiment of the method, the reflector assembly and the laser measuring assembly are mounted in the third orientations mutually orthogonal with the first and second orientations and steps (c)–(f) are repeated for the third orientation. As a result, displacement, straightness, pitch, yaw and roll errors are stored for each of the three directions of machine movement.

According to yet another aspect of the present invention, there is provided apparatus for measuring parametric position errors in a machine having a first element and a table which are movable in a selected direction relative to each other, comprising a reflector assembly attachable to the first element and a laser measuring assembly attachable to the table for directing a plurality of laser beams at the reflector assembly and for sensing laser beams reflected from the reflector assembly. The reflector assembly and the laser measuring assembly include means for measuring displacement errors along the selected direction, and means for measuring straightness errors in two directions perpendicular to the selected direction. The straightness measuring means comprises a retroreflector mounted to the reflector assembly, means for directing a laser beam at the retroreflector from the measuring assembly, and a photosensor located in the measuring assembly and partitioned into four quadrants for sensing deviations of the reflected beam from the center thereof.

The reflector assembly and the laser measuring assembly further include means for measuring pitch and yaw errors about two mutally orthogonal axes perpendicular to the selected direction comprising a mirror mounted to the reflector assembly, means for directing a laser beam at the mirror from the measuring assembly and a photosensor in the measuring assembly partitioned into four quadrants for sensing deviations of the reflected beam from the center thereof.

The reflector assembly and the laser measuring assembly still further include means for measuring roll error about the selected direction comprising a pair of retroreflectors spaced apart by a prescribed distance and mounted to the reflector assembly, means for directing individual laser beams at each of the retroreflectors from the measuring assembly and a pair of partitioned photosensors located in the measuring assembly for sensing the deviation of each reflected beam in a direction perpendicular to the selected direction. The roll error is proportional to the difference between the deviations sensed by the two photosensors divided by the prescribed distance therebetween.

According to another aspect of the present invention, there is provided, in a machine having a first element and a table which are movable in a selected direction relative to each other, apparatus for measuring roll error about the selected direction comprising a reflector assembly attachable to the first element and including a pair of retroreflectors spaced apart by a prescribed distance, a laser measuring assembly attachable to the table and including means for directing a pair of spaced-apart parallel laser beams at the retroreflectors and a pair of partitioned photosensors for sensing the displacement deviation of each reflected beam in a direction perpendicular to the selected direction, and means for determining roll error from the difference between the deviations sensed by the two photosensors divided by the prescribed distance therebetween.

According to a further aspect of the present invention there is provided, in a machine having a first element and a table which are movable in a selected direction relative to each other, apparatus for measuring pitch and yaw errors about two orthogonal axes perpendicular to the selected direction. The apparatus comprises a reflector assembly attachable to the first element and including a mirror mounted to the reflector assembly, a laser measuring assembly attachable to the table including means for the directing a laser beam at the mirror and a photosensor partitioned into four quadrants for sensing angular deviations of the reflected beam from the center thereof and means for determining pitch and yaw errors from the deviations sensed by the photocell divided by the distance between the mirror and the photosensor.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 10 is a side elevation view of the laser measuring assembly, the reflector assembly and the fixture on which the laser measuring assembly is mounted, with the reflector assembly shown in phantom displaced along the y-axis;

FIG. 11 is a front elevation view of the reflector assembly;

FIG. 12 is a front elevation view of the laser measuring assembly taken along the line 12—12 of FIG. 10, with the reflector assembly shown in phantom;

FIG. 13 is a bottom view of the laser measuring assembly taken along the line 13—13 of FIG. 12;

FIG. 14 is a cross-sectional view of the laser measuring assembly taken along the line 14—14 of FIG. 12;

DETAILED DESCRIPTION OF THE INVENTION

Figure 1:
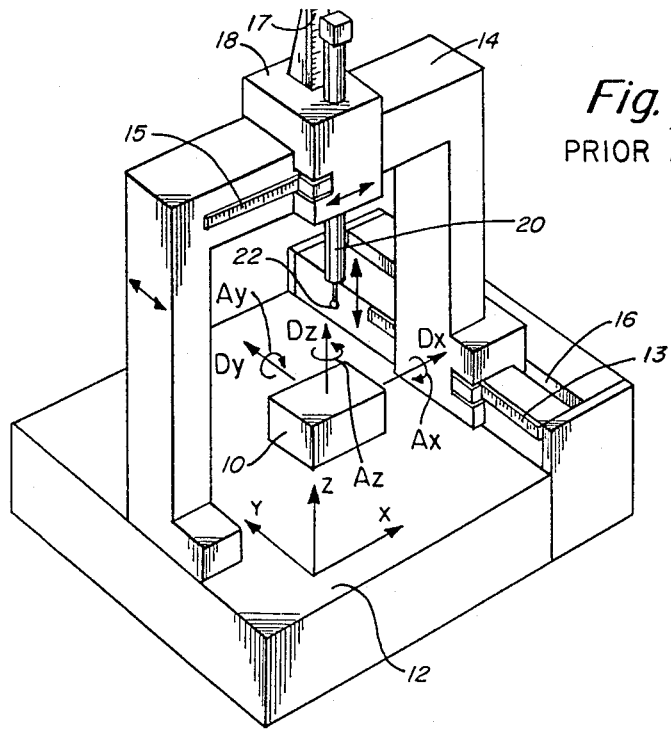
FIG. 1 is a perspective view of a coordinate measuring machine in accordance with the prior art.

A prior art moving bridge coordinate measuring machine is shown schematically in FIG. 1. The machine is intended for measurement of a workpiece 10 which is mounted on a fixed machine table 12. The x, y, and z axes of the machine are illustrated. A bridge 14 moves in the y direction along guideway 16 on the table 12. A carriage 18 moves in the x direction along guideways on the bridge 14. A ram 20 with a probe 22 mounted to its lower end moves vertically through bearings in the carriage 18. A scale 13 between the bridge 14 and the table 12, a scale 15 between the carriage 18 and the bridge 14, and a scale 17 between the ram 20 and the carriage 18 indicate the positions of the movable elements in the three axial directions. To measure the coordinates of a point on the workpiece 10, probe 22 is brought into contact with the point. The probe 22 senses contact and causes a system computer to read and store the readings on the three scale systems. An example of a moving bridge coordinate measuring machine is the Model 7101-2418 manufactured by Brown and Sharpe Manufacturing Co. The calibration system of the present invention can be used with most prior art coordinate measuring machines.

Errors are introduced into the scale readings by inaccuracies in the scale systems and by imperfections in the guideways along which each machine element travels. Each machine element is subject to errors having six components as it travels in a prescribed direction. The six error components are described with reference to movement of the bridge 14 in the y direction. Six error components are also associated with movement of the carriage 18 in the x direction and with movement of the ram 20 in the z direction. The first error component is a displacement error Dy along the direction of movement, the y direction. X direction and z direction displacement errors Dx and Dz are commonly known as straightness errors since they result from guideways which are not perfectly straight. The remaining error components are rotational. Rotation of the bridge 14 about the y axis is commonly known as roll Ay. Rotations of the bridge 14 about the x and z axes are commonly known as pitch Ax and yaw Az, respectively. A complete characterization of the machine with parametric errors requires measurement of the six error components at selected locations along each direction of movement, resulting in an error matrix having 18 columns. The total error at an arbitrary point in the measurement volume is calculated from the parametric errors as described hereinafter.

Figure 2:
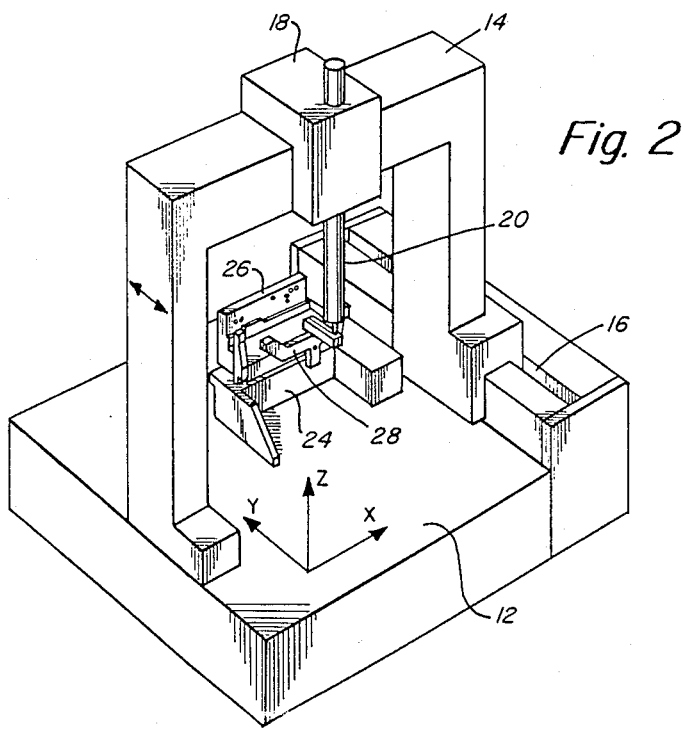
FIG. 2 is a perspective view of a coordinate measuring machine having the calibration system of the present invention mounted for y-axis calibration.

The calibration system of the present invention provides apparatus attachable to the coordinate measuring machine for measurement of the 18 error components. The present invention also provides a method for performing the error measurements. As shown in FIG. 2, the calibration apparatus includes a mounting fixture 24 which is mounted in a fixed position on the table 12. The apparatus further includes a laser measuring assembly 26 attachable to the mounting fixture 24 in three different orientations. The calibration apparatus further includes a reflector assembly 28 attachable to the ram 20 in three different orientations.

In each of the three orientations, the laser measuring assembly 26 directs several laser beams at the reflector assembly 28. The measuring assembly 26 and the reflector assembly 28 are aligned in each of the three orientations so that the laser beams are reflected back to the measuring assembly 26 and are sensed. In each of the three orientations, the laser beams generated by the measuring assembly 26 are parallel to one of the directions of movement. In the orientation shown in FIG. 2, the measuring assembly 26 and the reflector assembly 28 are aligned such that the laser beams remain in alignment with the elements of the reflector assembly 28 as the bridge 14 is moved in the y direction. In the orientation shown in FIG. 3, the measuring assembly 26 and the reflector assembly 28 are aligned such that the laser beams remain in alignment with the reflector assembly 28 as the ram 20 is moved in the z direction. Similarly, in the orientation shown in FIG. 4, the measuring assembly 26 and reflector assembly 28 are aligned such that the laser beams remain in alignment with the reflector assembly 28 as the carriage 18 is moved in the x direction.

Calibration of a coordinate measuring machine starts with mounting of the mounting fixture 24 on the table 12 of the machine as shown in FIG. 2. The fixture 24 is placed in a predetermined position, is aligned with the machine axes, and is clamped in place. The laser measuring head 26 is placed on locators on top of the fixture 24 oriented for y axis measurements. Reflector assembly 28 is engaged with locators on the measuring assembly 26 and secured with a mounting screw. The ram 20 is moved to a start position and is clamped to the reflector assembly 28. The carriage 18 and the ram 20 are locked to their guideways. The mounting screw is removed and the bridge 14 is moved in the y direction to selected calibration positions. The spacing and number of the calibration positions depends on the size of the machine and the expected rate of change of errors. A typical spacing of calibration positions is about one inch. For each position, the outputs of the laser measuring assembly 26 and the scale systems of the coordinate measuring machine are read by a calibration computer 30. These outputs are processed to determine y axis parametric errors.

Figure 3:
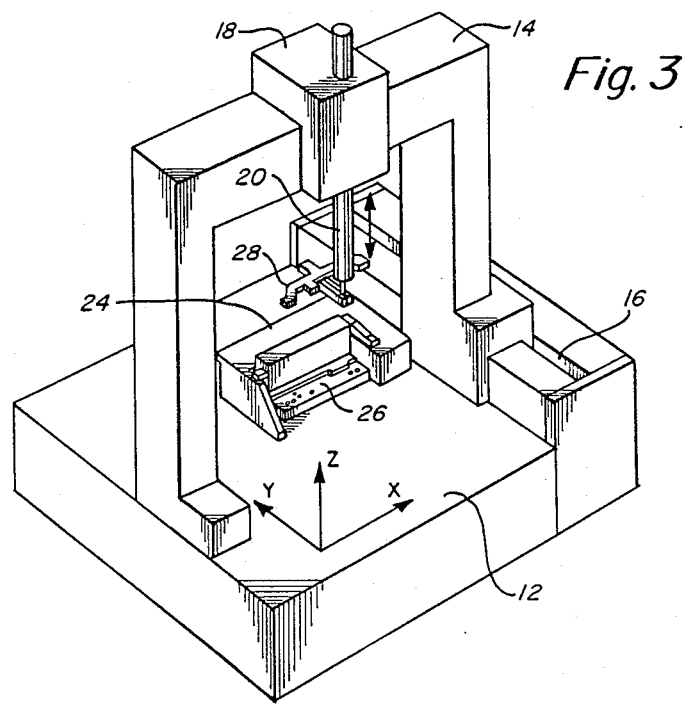
FIG. 3 is a perspective view of a coordinate measuring machine having the calibration system of the present invention mounted for z-axis calibration.

For z axis error measurements, the laser assembly 26 is placed on locators on top of the fixture 24 which are oriented for z direction measurements as shown in FIG. 3. The reflector assembly 28 is engaged with locators on the measuring assembly 26 and is secured with a mounting screw. The ram 20 is moved to the start position and clamped to the reflector assembly 28. The bridge 14 and the carriage 18 are locked in their guideways. The mounting screw is removed and the ram 20 is moved in the z direction to selected calibration positions. The z axis parametric errors are measured in a manner similar to the measurement of y axis errors described above.

Figure 4:
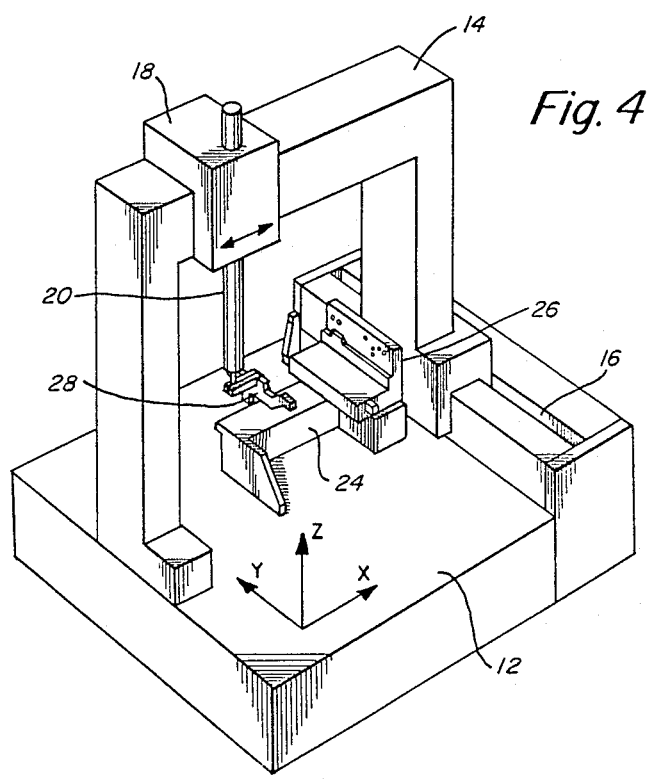
FIG. 4 is a perspective view of a coordinate measuring machine having the calibration system of the present invention mounted for x-axis calibration.

For x axis error measurement, laser measuring assembly 26 is placed on locators on top of the fixture 24 which are oriented for x direction measurements as shown in FIG. 4. The reflector assembly 28 is engaged with locators on the measuring assembly 26 and is secured with the mounting screw. The ram 20 is moved to a start position and is clamped to the reflector assembly 28. The bridge 14 and the ram 20 are locked to their guideways. The mounting screw is removed and the carriage 18 is moved in the x direction to selected calibration positions. The x axis parametric errors are measured in a manner similar to the measurement of y axis errors as described above.

The calibration computer 30 processes the error matrix to a standard form and stores it on a computer disk. When the coordinate measuring machine is used to measure workpieces, the machine computer loads the error matrix from the disk. When coordinates of a point on the workpiece are measured, the machine retrieves the corresponding parametric errors from the matrix, calculates x, y and z errors, and subtracts them as corrections.

Figure 5:
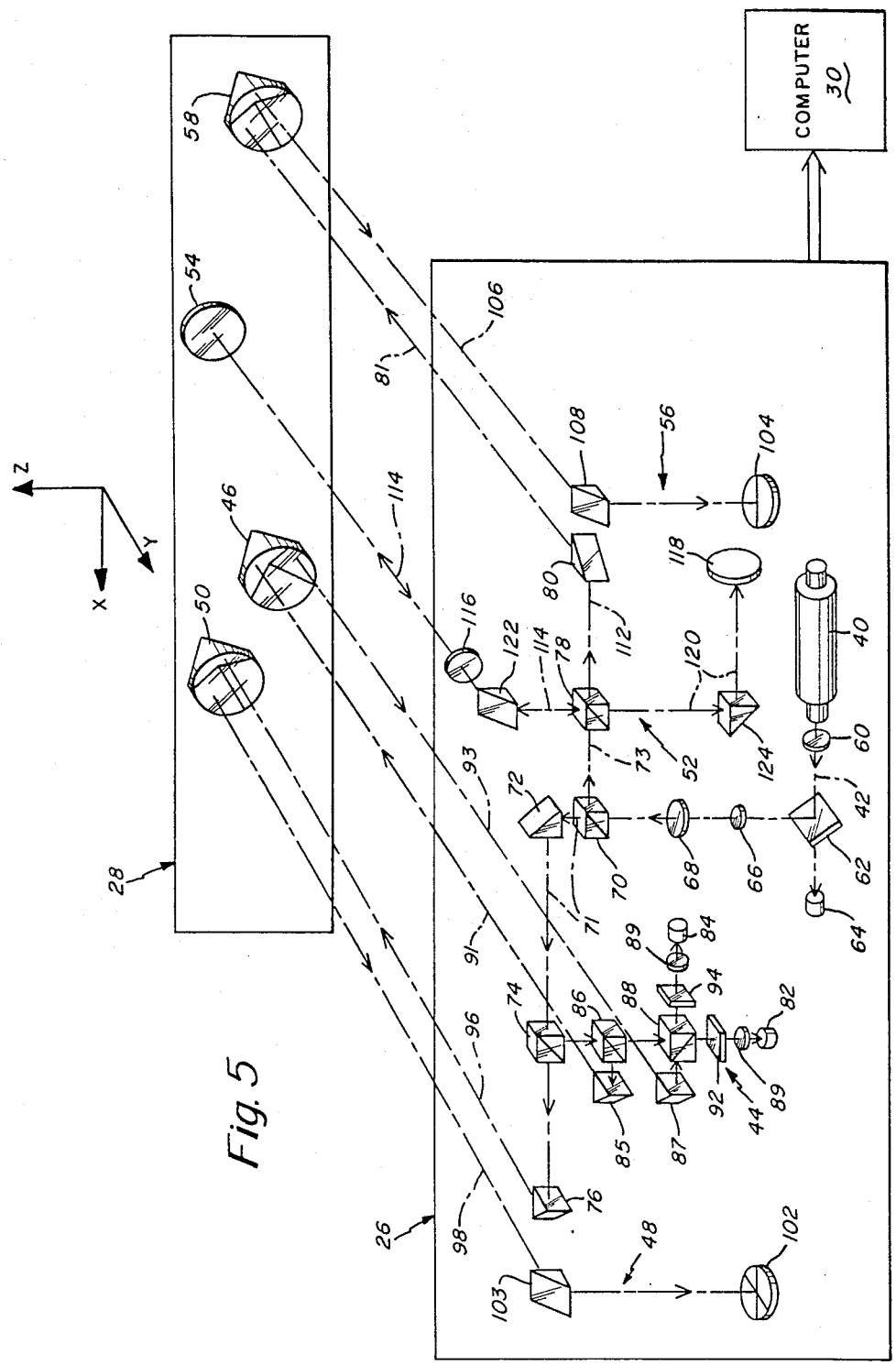
FIG. 5 is a perspective schematic view of the optics of the calibration system of the present invention.

A schematic optical diagram of the laser measuring assembly 26 and the reflector assembly 28 is shown in FIG. 5. A laser 40 mounted within the measuring assembly 26 supplies a laser beam 42, which is split several times to provide the beams required for measurement of the six parametric errors. A portion of the laser beam 42 is supplied to a displacement error measuring means 44, which, in conjunction with a retroreflector 46 mounted on the reflector assembly 28, measures actual displacement of the reflector assembly 28 relative to the measuring assembly 26. A straightness measuring means 48 in the measuring assembly 26, in conjunction with a retroreflector 50 on the reflector assembly 28, measures straightness deviations Dx and Dz of the reflector assembly 28 in the x and z directions as it is moved in the y direction. A pitch and yaw measuring means 52 in the measuring assembly 26, in conjunction with a mirror 54 on the reflector assembly 28, measures rotations Ax and Az of the reflector assembly 28 about the x and z axes, respectively. A second straightness measuring means 56 in the measuring assembly 26 and a retroreflector 58 mounted on the reflector assembly 28, are used in combination with the first straightness measuring means 48 and retroreflector 50 to measure rotation or roll Ay of the reflector assembly 28 about the y axis. The measuring devices shown in FIG. 5 are described with reference to FIGS. 6–9 which illustrate the measuring means in simplified form for ease of understanding.

In a preferred embodiment, the laser 40 emits beam 42 with a single wavelength. In one example of the present invention, the laser plasma tube is a Melles Griot Model 05 LHP 900 helium neon laser. As the laser cavity length increases during warmup, resonance alternates between a desirable single wavelength mode and an undesirable double wavelength mode. The output of the laser 40 is stabilized in the single wavelength mode using heaters in proximity to the laser tube. The heaters are controlled by sensing the output beam of laser 40. The laser 40 has a Brewster angle window in its cavity which fixes the plane of polarization of the beam 42. The beam 42 passes through a quarter wave retarder 60 which is set with its optic axis at 45° to the plane of polarization of the laser 40 output. A small portion of the laser beam is separated from the main beam 42 by a partially silvered mirror 62 and is sensed by a photosensor 64. The output signal from the photosensor 64 controls the laser cavity heaters since the output power of the laser is a known function of the degree to which the desirable single wavelength mode is achieved.

A lens 66 spreads the main beam reflected by the mirror 62, and a lens 68 downstream of lens 66 collimates the beam. This arrangement reduces dispersion of the beam over long distances. A beam splitter 70, splits the beam from the lens 68 into two branches, a first branch 71 directed by a prism 72 to the displacement measuring means 44 and to the straightness measuring means 48, and a second branch 73 directed to the pitch and yaw measuring means 52 and to the second straightness measuring means 56. A beam splitter 74, directs part of the first branch 71 from the prism 72 to the displacement measuring means 44. The beam which passes through the beam splitter 74, is directed by a prism 76 to retroreflector 50 and is reflected to the straightness measuring means 48. A beam splitter 78 directs part of the second branch 73 from the beam splitter 70 to mirror 54. The reflected beam from mirror 54 goes to the pitch and yaw measuring means 52. The beam which passes through the beam splitter 78 is directed by a prism 80 as beam 81 to retroreflector 58 and is reflected to the second straightness measuring means 56.

Linear displacement errors in the parametric error matrix are the differences between scale readings and laser distance measurements. Laser distance measurements are made with an interferometer. The preferred interferometer uses a single frequency laser with circular polarization as described hereinafter. However, any type of distance measuring interferometer can be used.

In a distance measuring interferometer, the laser beam is split into two parts, a measuring beam and a reference beam. The length of the measuring beam path changes as distance to be measured changes. The length of the reference beam path is fixed. The two beams are reflected and combined. If they combine in phase, they reinforce and form a bright fringe. If the beams combine out of phase, they cancel and form a dark fringe. The number of changes between light and dark fringes are counted as a measure of distance.

Figure 6:
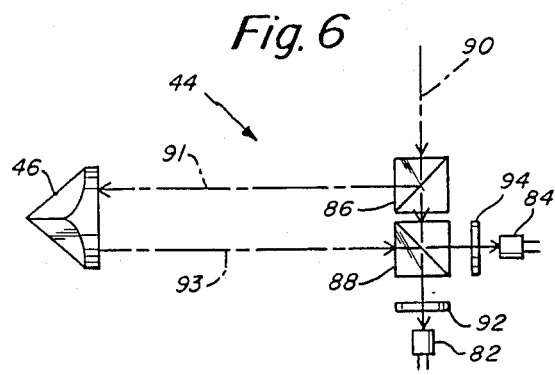
FIG. 6 is a simplified schematic diagram of the interferometer used in the calibration system of the present invention for measuring displacement errors.
Figure 7:
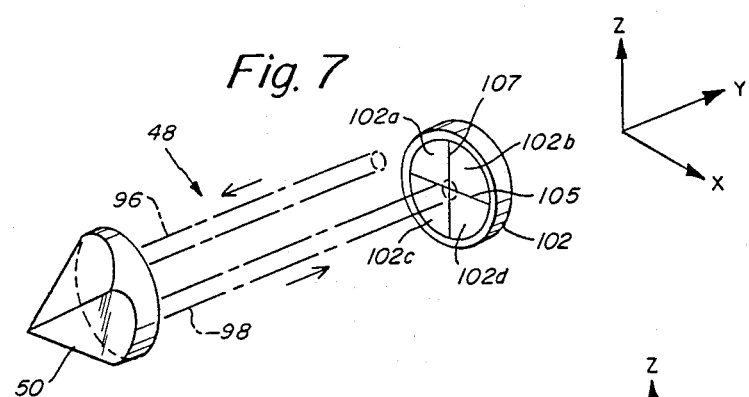
FIG. 7 is a simplified schematic diagram of the optics used in the calibration system of the present invention for measuring straightness.
Figure 8:
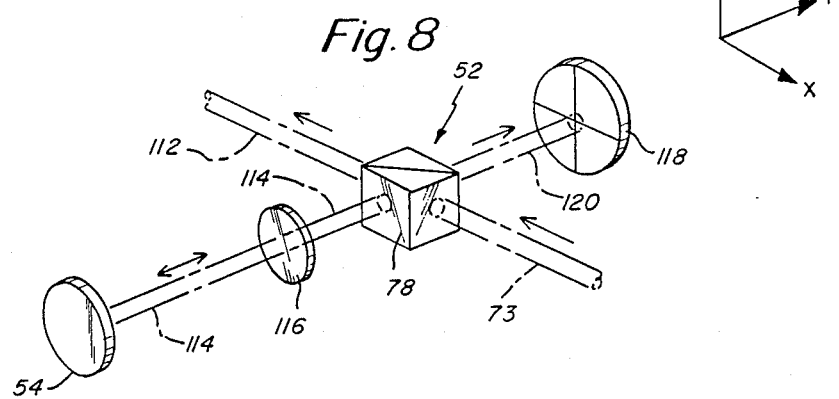
FIG. 8 is a simplified schematic diagram of the optics used in the calibration system of the present invention for measuring pitch and yaw.
Figure 9:
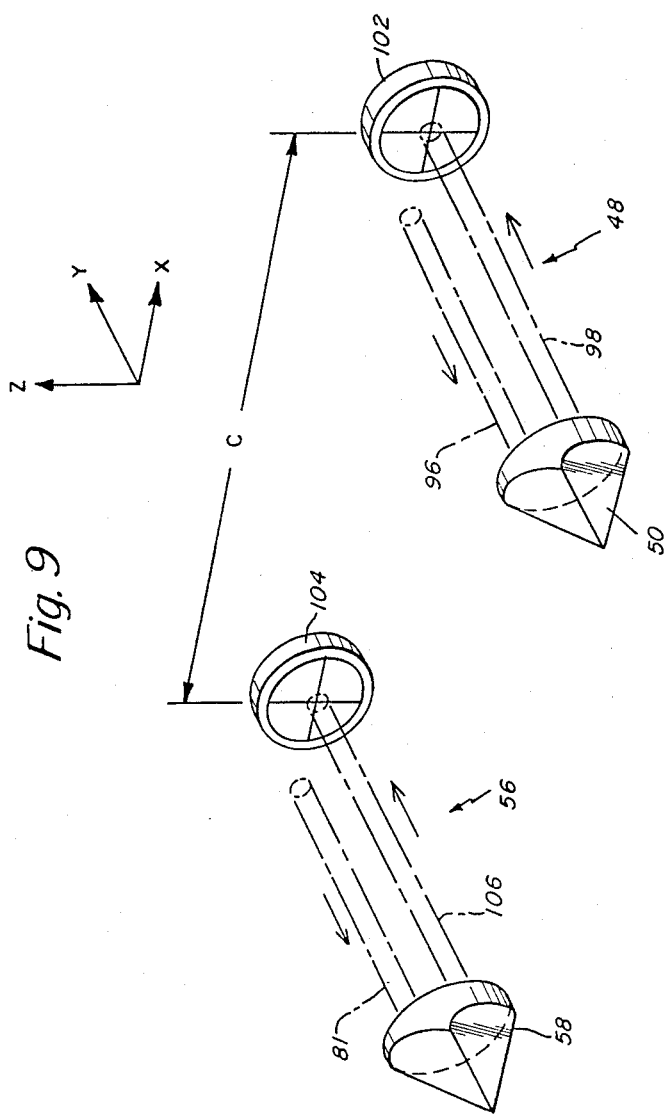
FIG. 9 is a simplified schematic diagram of the optics used in the calibration system of the present invention for measuring roll.

The preferred interferometer for distance measurement is shown in simplified form in FIG. 6. Two fringe patterns are produced, one at a photosensor 82, and one at a photosensor 84. Beam splitters 86 and 88 are each made up of two 90° prisms cemented together, one prism being coated at the joint with a partially reflective coating. The coating is a hybrid metal dielectric which has negligible effect on polarization. The incoming beam 90 from beam splitter 74 is split into two parts by beam splitter 86, a first part going to beam splitter 88 and a second part 91 going to retroreflector 46. The beam from beam splitter 86 is split into two parts by beam splitter 88, a first part going to photosensor 82 and a second part going to photosensor 84. A return beam 93 reflected by the retroreflector 46 is split into two parts, a first part going to photosensor 82 and a second part going to photosensor 84. Retroreflector 46 is located in the reflector assembly 28 and moves with the machine ram 20. The other components shown in FIG. 6 are located in the laser measuring assembly 26.

The fixed length reference beam for photosensor 82 is from beam splitter 86 straight through beam splitter 88 to sensor 82. The variable length measuring beam is from the beam splitter 86 to retroreflector 46, reflected back to beam splitter 88 and reflected by beam splitter 88 to photosensor 82. The fixed length reference beam for the photosensor 84 is from the beam splitter 86 and reflected by beam splitter 88 to the sensor 84. The variable length measuring beam for photosensor 84 is from beam splitter 86 to retroreflector 46, reflected by retroreflector 46 to beam splitter 88 and straight through beam splitter 88 to the sensor 84.

The retroreflector 46 is preferably a prism corner cube which can be considered a corner cut off a glass cube. Light beam 91 entering from beam splitter 86 is reflected three times from the back faces of the corner cube and is returned as beam 93 parallel to its incident path to beam splitter 88.

A characteristic of circularly polarized light is that its hand is reversed whenever it is reflected. The reference beam to photosensor 82 has no reflections, while the measuring beam is reflected five times. Thus, the two beams at the photosensor 82 have polarizations of opposite hand. The reference beam to photosensor 84 is reflected once while the measuring beam is reflected four times. Thus, the two beams at the photosensor 84 also have polarizations of opposite hand. When two circularly polarized beams of opposite hand are combined, they form a single plane polarized beam. The plane of polarization depends on the phase relationship between the beams.

As retroreflector 46 moves and the measuring path length of the beam to photosensor 82 changes, the phase relationship changes. This causes the plane of polarization to rotate about the beam path. A polarizing filter 92 is placed between beam splitter 88 and photosensor 82. As the plane of polarization rotates, it aligns with the axis of the filter 92 twice per revolution, and light passes through to the photosensor 82. Also, twice per revolution the plane of polarization is perpendicular to the axis of the filter 92 and all light is blocked. Thus, photosensor 82 sees alternate light and dark fringes as retroreflector 46 moves. A polarizing filter 94 is placed in front of photosensor 84 and causes the same effect.

The electrical outputs of photosensors 82 and 84 are proportional to the amount of light striking them. When retroreflector 46 moves at constant speed, the outputs are sinusoidal. The axes of polarizing filters 92 and 94 are oriented so that the two sinusoidal signals from photosensors 82 and 84 are in quadrature, that is, so that one leads the other by one quarter cycle. When the retroreflector 46 moves in one direction, the output of one photosensor leads the other by 90°. When the retroreflector 46 moves in the opposite direction, the output of the same photosensor lags the other by 90°. This characteristic is used to determine the direction of the movement. The number of cycles from each photosensor indicates the distance moved and is accumulated in a counter, while the phase relationship between the two outputs indicates the direction of movement.

With reference to FIG. 5, the displacement measuring means 44 further includes a prism 85 which directs the beam 91 from the beam splitter 86 to the retroreflector 46 and a prism 87 which directs the reflected beam 93 from the retroreflector 46 to the beam splitter 88. These prisms permit a more compact design. Also shown in FIG. 5 are optional lenses 89 between polarizing filter 92 and photosensor 82 and between polarizing filter 94 and photosensor 84. The lenses 89 focus light on the photosensors 82, 84 and increase the output signal.

Straightness is a linear error in a direction perpendicular to the intended direction of motion. For each calibration point along the direction of movement, there are two straightness errors in directions perpendicular to each other. The straightness measuring means 48 and the retroreflector 50 are illustrated in simplified form in FIG. 7. A laser beam 96 in the direction for which straightnesses are being measured is reflected by retroreflector 50 on reflector assembly 28 back along a parallel path as beam 98 to a four quadrant photodetector 102 in laser measuring assembly 26.

The retroreflector 50 is a corner cube or a cat's eye which has two characteristics important to straightness measurement. The first is that the beams 96 and 98 are parallel regardless of angular errors in positioning the retroreflector. This means that machine rotational errors do not affect straightness measurements. The second characteristic is that beams 96 and 98 when viewed along the y axis are symmetrical with respect to the vertex of the retroreflector.

For y axis straightness measurement, the four quadrant photodetector 102 is located so that when the bridge 14 is at y=0, the beam 98 is centered with respect to perpendicular dividing lines 105 and 107. For another y position, let there be a vertical straightness error Dz. This error moves reflector assembly 28 and the vertex of retroreflector 50 a vertical distance Dz. Because of the above-noted symmetry, return beam 98 moves vertically by 2Dz. Thus, the beam 98 strikes photodetector 102 displaced vertically 2Dz from horizontal dividing line 105. Similarly, when there is a horizontal straightness error Dx, the vertex of corner cube 50 moves horizontally by Dx. Return beam 98 moves horizontally 2Dx and is displaced horizontally 2Dx from vertical dividing line 107. The four quadrant photodetector 102 is made up of four photodiodes 102a, 102b, 102c and 102d separated by dividing lines 105 and 107. Each photodiode has an electrical output proportional to the light striking it. For measurement of vertical straightness Dz, the sum of outputs from photodiodes 102c and 102d is subtracted from the sum of the outputs from photodiodes 102a and 102b. The result is divided by the sum from all four photodiodes to remove the effects of variation in beam intensity. The result is multiplied by a constant to convert to conventional length units. Similarly, horizontal straightness Dx is determined by subtracting the sum of outputs from photodiodes 102b and 102d from the sum of outputs from photodiodes 102a and 102c and dividing the result by the sum of outputs from all four photodiodes.

With reference to FIG. 5, it is noted that the straightness measuring means includes a prism 103 which redirects the reflected beam 98 from the retroreflector 50 to photosensor 102. The prism 103 permits a more compact design.

Roll is rotational error about the axis of movement. Again considering movement along the y axis, data for determining roll error is measured by making two measurements of vertical straightness Dz along two lines spaced apart in the x direction. With reference to FIG. 5, one vertical straightness measurement is taken by first straightness measuring means 48 and retroreflector 50, while a second straightness measurement is taken by second straightness measuring means 56 and retroreflector 58. Roll measurement is illustrated in simplified form in FIG. 9. In first straightness measuring means 48, vertical straightness $Dz_1$ is determined by photodetector 102 which detects vertical deviations of return beam 98 as described above. Similarly, in second straightness measuring means 56, a photodetector 104 senses vertical straightness $Dz_2$ by sensing vertical deviations of a reflected beam 106 from retroreflector 58. In measuring roll only vertical displacements are of interest. Therefore, the photodetector 104 requires only two photodiodes. (The photodetector 102 requires four quadrants since it is also used for straightness measurements.) Alternatively, the upper two photodiodes and the lower two photodiodes of a four quadrant photodetector may be wired together for photodetector 104. For each calibration position, roll measured in radians is calculated by substracting the two vertical straightness measurements and dividing by the distance C between the first and second straightness measuring means 48, 56. Thus, roll=$(Dz_2-Dz_1)/C$.

With reference to FIG. 5, the second straightness measuring means 56 includes a prism 108 which directs the beam 106 from retroreflector 58 to photodetector 104.

Yaw and pitch are rotational errors about axial directions perpendicular to the axis of motion. For horizontal (x and y) calibration, yaw is rotation about a vertical axis and pitch is rotation about a horizontal axis. For vertical (z) calibration, yaw is defined as rotation about a y direction line and pitch is rotation about a x direction line. The pitch and yaw measuring means 52 is shown in simplified form in FIG. 8. Incoming laser beam 73 is split by beam splitter 78. A transmitted beam 112 passes through the splitter 78 and is used for roll measurement as described hereinabove. A reflected beam 114 passes through a quarter wave plate 116 to mirror 54 on reflector assembly 28. The beam 114 is reflected back on itself through the quarter wave plate 116 and beam splitter 78 to a four quadrant photodetector 118.

Incoming beam 73 is circularly polarized. Beam splitter 78 has an all dielectric partial reflection coating which has a strong effect on polarization. The result is that transmitted beam 112 is substantially horizontally polarized and reflected beam 114 is vertically polarized.

Quarter wave plate 116 is oriented with its axis at 45° to the plane of polarization of the reflected beam 114 and converts the beam 114 back to circular polarization. Reflection from mirror 54 reverses the hand of the polarization. The return beam in passing back through the quarterwave plate 116 is reconverted back to plane polarization but, due to the change of hand at the mirror 54, the polarization is now in the horizontal plane. Polarizing beam splitter 78 passes the entire reflected beam through to photodetector 118.

There are two reasons for this complex maneuver with polarization. First, it insures that all the light is used. If beam splitter 78 were nonpolarizing, half the return beam from the mirror 54 would be reflected back along the path of beam 73. Second, it prevents spurious reflections from quarter wave plate 116 and from the measurement means 56 from reaching the photodetector 118. Reflections from the quarter wave plate 116, being vertically polarized, are reflected back along the path of beam 73. Reflections from the second straightness measuring means 56 are horizontally polarized and pass through the beam splitter 78 along the path of beam 73.

For performing y axis pitch and yaw measurements, the photodectector 118 is located so that reflected beam 120 is centered when the bridge 14 is at y=0. For another calibration position with a yaw error Az, plane mirror 54 rotates by Az about the vertical z axis. From the laws of reflection this causes an angle 2Az between the incident and reflected beams, and reflected beam 120 is displaced horizontally on photodetector 118. The amount of displacement is determined in the same manner as for straightness. Yaw Az in radians is calculated as half the displacement at photodetector 118 divided by the distance from mirror 54 to photodetector 118. This distance is a fixed distance determined when the bridge 14 is at y=0 plus the distance of travel to the calibration point. In the case of pitch Ax, the mirror 54 rotates about a horizontal x axis. Similarly to the case of yaw, this causes an angle 2Ax between the incident and reflected beams, and reflected beam 120 is displaced vertically on photodetector 118. Pitch Ax in radians is calculated as half the displacement at photodetector 118 divided by the distance from the mirror 54 to the photodetector 118.

With reference to FIG. 5, the pitch and yaw measurement means 52 further includes a prism 122 which directs beam 114 from beam splitter 78 to quarter wave plate 116, and a prism 124 which directs reflected beam 120 from beam splitter 78 to photodetector 118.

A preferred embodiment of the calibration system of the present invention is illustrated in FIGS. 10–17. The elements of the laser measuring assembly 26 shown in FIG. 5 are contained within a housing 130 having a generally L-shaped cross-section. The laser measuring assembly 26 is adapted for attachment to mounting fixture 24 in three different orientations as described hereinafter.

The reflector assembly 28, as best shown in FIG. 11, includes a support bracket 132 that provides rigid support for retroreflectors 46, 50 and 58 and for the mirror 54. Three cone-pointed screws 134 mate with locators 134a (FIG. 12) during setup. A clearance hole 136 is provided for a single screw 137 which is threaded into measuring assembly 28 and secures the reflector assembly 28 to the laser assembly 26 during setup. A spring 139 and a washer 140 on the shank of screw 137 urge the reflector assembly 28 against laser measuring assembly 26, with screws 134 maintaining the desired spacing. A ball 138 and a clamp 141 are used to clamp the reflector assembly 28 to a ball-ended stud 142 mounted in the probe socket.

Figure 16:
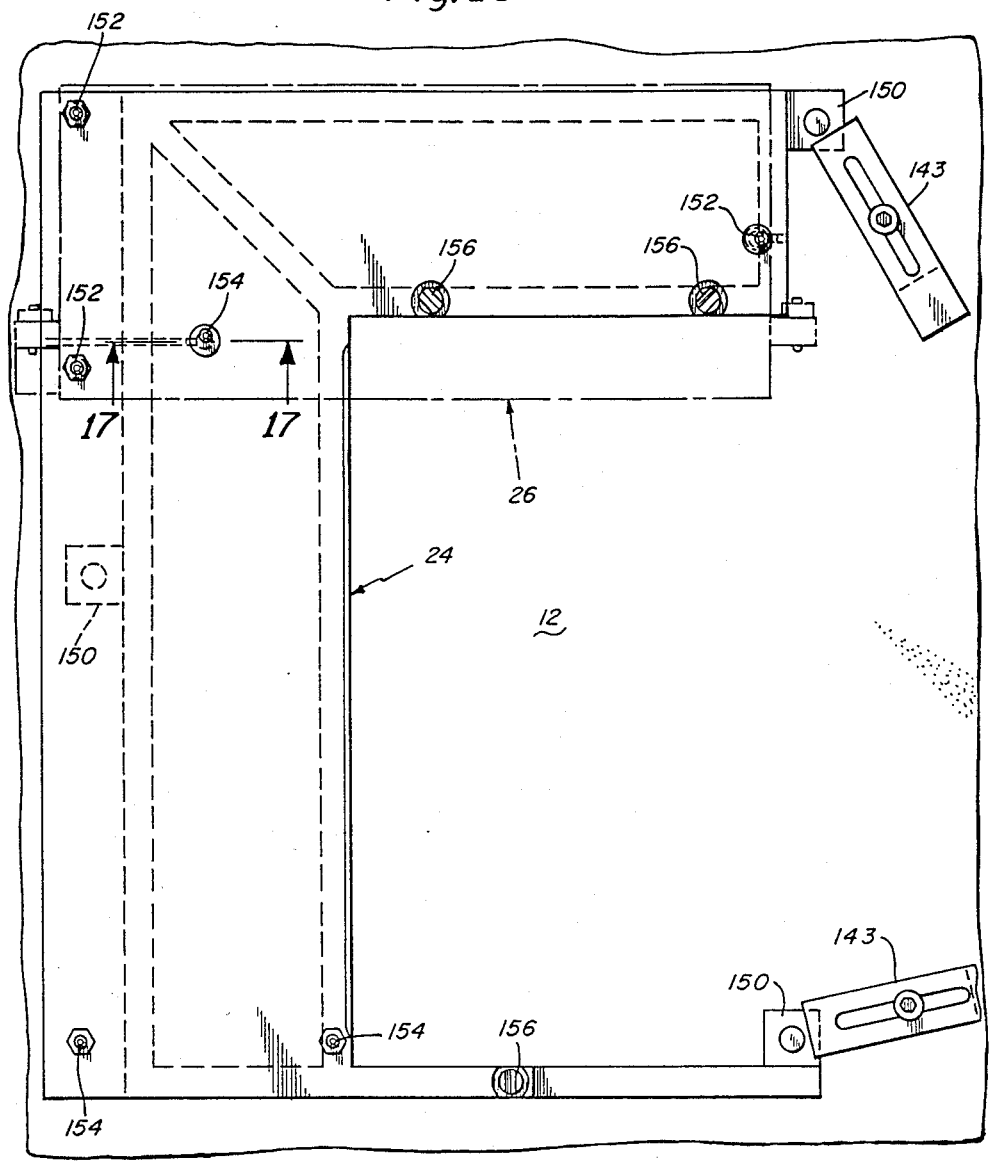
FIG. 16 is a plan view of the fixture on which the laser measuring assembly is mounted taken along the line 16—16 of FIG. 10.

A plan view of the fixture 24 is shown in FIG. 16. It comprises a three-sided frame that is rigidly mounted to the table 12 and which provides means for mounting the measuring assembly 26 in three mutually orthogonal orientations (see FIGS. 2-4). The mounting fixture 24 is placed directly on the machine table 12 and is secured with standard tooling clamps 143. The clamps 143 are secured by means of threaded inserts in the table 12. With reference to FIGS. 10 and 16, feet 150 of fixture 24 are clamped to table 12. Three mounting pins 152 are used for mounting laser measuring assembly 26 in the x direction, three mounting pins 154 are used for mounting laser measuring assembly 26 in the y direction and three locators 156 are used for mounting laser assembly 26 in the z direction. Locators 152a on the bottom of laser measuring assembly 26 (FIG. 13) mate with pins 152 during x direction mounting and mate with pins 154 during y direction mounting. For z direction mounting, the laser measuring assembly includes pins 156a (FIG. 12) which mate with locators 156. Two of the pins 156a are mounted on an upstanding arm 144 attached to the side of housing 130.

Figure 17:
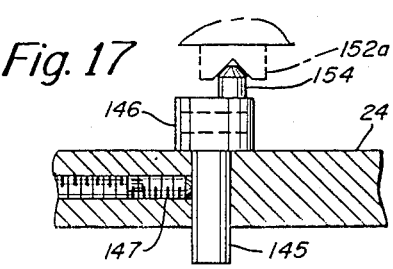
FIG. 17 is an enlarged view, partly in cross-section, of an eccentric cam for alignment of the laser measuring assembly.

An eccentric cam for alignment of the laser measuring assembly 26 is illustrated in FIG. 17. A pin 145 is inserted in fixture 24 with sufficient clearance to permit rotation. A collar 146 is attached to the upper end of pin 145 and pin 154 is offset from the center of collar 146. As collar 146 is rotated, pin 154 moves in a circle to permit fine adjustment of the laser measuring assembly 26 position. The eccentric cam arrangement can be held in fixed position by a set screw 147 after adjustment. Typically, only one of the three mounting pins utilizes the eccentric cam arrangement of FIG. 17.

Figure 15:
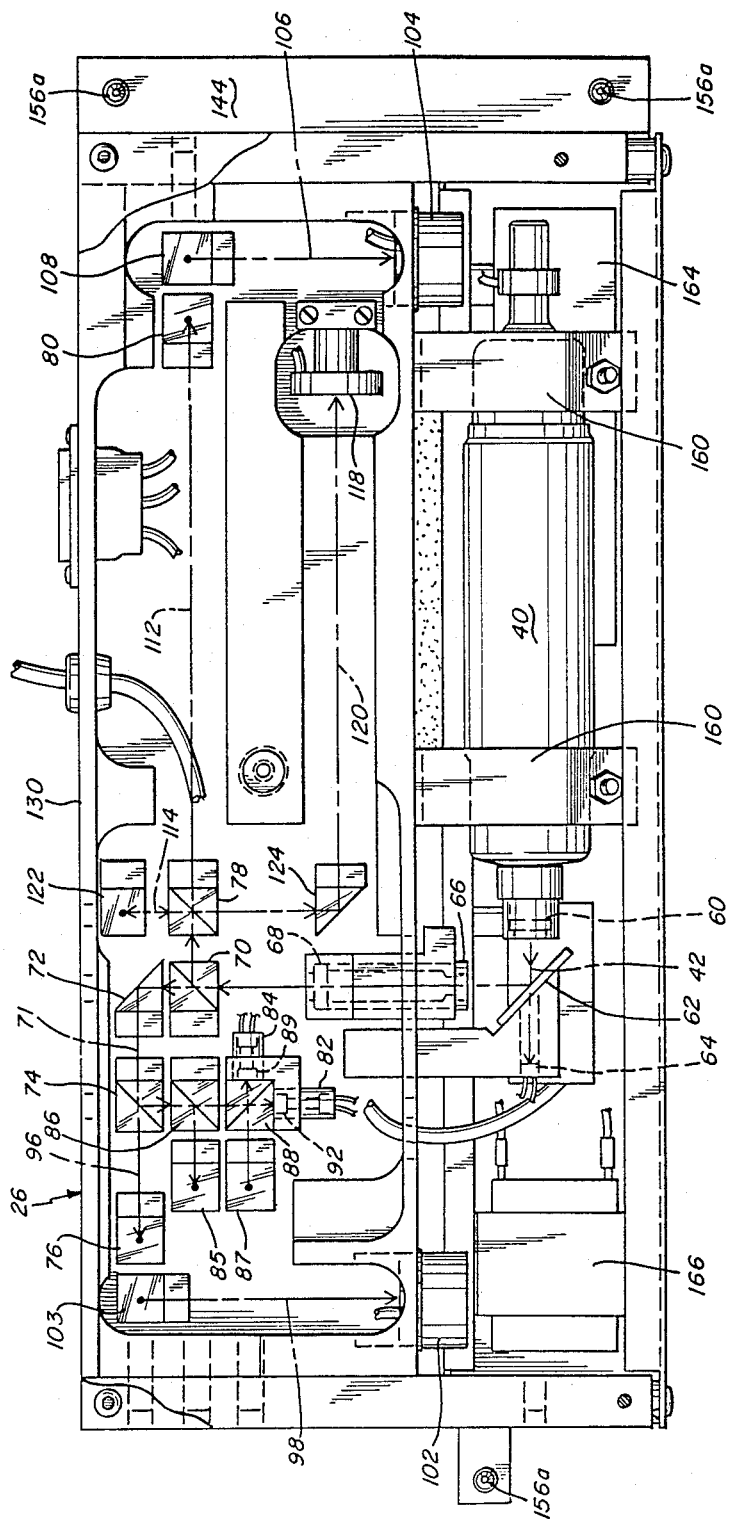
FIG. 15 is a rear elevation view of the laser measuring assembly taken along the line 15—15 of FIG. 14 and cut away to illustrate the interior elements.

The arrangement of elements within the laser measuring assembly 26 is illustrated in FIGS. 13-15. The placement of the optical elements shown in FIG. 5 is illustrated in FIG. 15 by like reference numerals. The laser 40 is mounted by means of brackets 160 and springs 162. A laser power supply 164 provides the necessary operating voltages to laser 40. A transformer 166 supplies power for the laser heaters as discussed hereinabove. The transformer 166 has two output voltages connected to solid state relays 168 and 170, respectively (FIG. 13). The relays 168, 170 switch power from the transformer 166 to the laser heaters under control of computer 30. The higher voltage is used for fast warm-up. The lower voltage is used for cavity length control. With reference to FIG. 14, prism 122, which directs beam 114 at the reflector assembly 28, is attached to housing 130 by means of a bezel 168. The prisms 108, 80, 76, 103, 85 and 87 are mounted in the same manner. Thus, there is provided a rugged and compact laser measuring assembly 26 well adapted for movement between different measurement positions.

It will be understood that various changes and modifications are included within the scope of the present invention. For example, while the calibration system has been described with reference to a bridge-type coordinate measuring machine which utilizes a fixed table and a ram movable in three dimensions, the calibration system is equally applicable to any machine having two elements which are movable relative to each other. Either or both machine elements can be movable. For example, some types of coordinate measuring machines utilize a movable table. Furthermore, the reflector assembly 28 is described as having only reflective elements, and all sensing elements are located in the laser measuring assembly 26. The calibration system can be modified so that one or more of the sensing elements are located on the reflector assembly 28. For example, the straightness measuring photodetectors can be placed on the reflector assembly 28. The drawback to this configuration is that electrical connections must be made to the reflector assembly which in most cases is movable. Where all laser beams are reflected by the reflector assembly 28, no electrical connections are required. A further variation within the scope of the present invention is to mount the laser in a fixed position and to provide a movable assembly to direct the beam from the laser along the three measurement axes A further variation is to use prior art interferometric means to measure pitch, yaw, straightness and roll.

The output signals from photosensors 82, 84, 102, 104 and 118 are supplied through appropriate signal conditioning circuitry to computer 30 for calculation and storage of parametric errors In calculating the total error at an arbitrary point in the measuring volume of the machine, the following notation is used.

$D_{ij}$ = a translational position error,
$A_{ik}$ = angular position error,
$P_m$ = component of distance from the probe reference point to the probe tip,
$e_i$ = axial component of total error at the probe tip,
where $i$ = x, y or z = the axis relative to which the position error is measured,
$j$ = x, y or z = the axial direction of the error,
$k$ = x, y or z = the axis about which the rotational error is measured, and
$m$ = x, y or z = the direction of the distance component.

Thus, for example, $D_{yz}$ is the vertical (z direction) straightness measured along the y direction, while $A_{yy}$ is the roll about the y direction measured along the y direction.

Rather than using the conventional approach of attaching the axis system to each component and writing equations for transformations between the axis systems, we use a simpler approach. The simple approach is to determine error component due to each parameter, then add components for each axial direction. The simple approach is adequate because the primary errors are small, and the secondary (cosine) errors are therefore negligible. The errors for a point X, Y, Z in a bridge type machine as shown in FIG. 1 are tabulated in accordance with this approach in Table 1. The rotations are about the machine axes rather than the guideways.

TABLE 1

| Description | X Effect | Y Effect | Z Effect |
|---|---|---|---|
| Error in scale measurement | 0 | Dyy | 0 |

TABLE 1-continued

| Description | X Effect | Y Effect | Z Effect |
|---|---|---|---|
| of bridge travel | | | |
| Horizontal straightness of bridge motion | $-Dyx$ | 0 | 0 |
| Vertical straightness of bridge motion | 0 | 0 | $-Dyz$ |
| Bridge rotation about vertical axis | $Py \cdot Ayz$ | $-(x + Px)Ayz$ | 0 |
| Bridge rotation about x axis | 0 | $(Z + Pz)Ayx$ | $-Py \cdot Ayx$ |
| Bridge rotation about y axis | $-(Z + Pz)Ayy$ | 0 | $(x + Px)Ayy$ |
| Error in scale measurement of carriage travel | $Dxx$ | 0 | 0 |
| Horizontal straightness of carriage motion | 0 | $-Dxy$ | 0 |
| Vertical straightness of carriage motion | 0 | 0 | $-Dxz$ |
| Carriage rotation about vertical axis | $Py \cdot Axz$ | $-Px \cdot Axz$ | 0 |
| Carriage rotation about y axis | $-(Z + Pz)Axy$ | 0 | $Px \cdot Axy$ |
| Carriage rotation about x axis | 0 | $(Z + Pz)Axx$ | $-Py \cdot Axx$ |
| Error in scale measurement of ram motion | 0 | 0 | $Dzz$ |
| y straightness of ram motion | 0 | $-Dzy$ | 0 |
| x straightness of ram motion | $-Dzx$ | 0 | 0 |
| Ram rotation about y axis | $-Pz \cdot Azy$ | 0 | $Px \cdot Azy$ |
| Ram rotation about x axis | 0 | $Pz \cdot Azx$ | $-Py \cdot Azx$ |
| Ram rotation about z axis | $Py \cdot Azz$ | $-Px \cdot Azz$ | 0 |

Columns of the table are added to find total errors.

$ex = Dxx - Dyx - Dzx - (Z + Pz)Axy + Py \cdot Axz - (Z + Pz)Ayy + Py \cdot Ayz - Pz \cdot Azy + Py \cdot Azz$ $ey = Dyy - Dzy - Dxy - (X + Px)Ayz + (Z + Pz)Ayx - Px \cdot Axz + Pz \cdot Azx - Px \cdot Axz + (Z + Pz)Axx$ $ez = Dzz - Dxz - Dyz - Py \cdot Azx + Px \cdot Azy - Py \cdot Axx + Px \cdot Axy - Py \cdot Ayx + (X + Px)Ayy$ To correct machine errors, ex is subtracted from the X scale reading, ey is subtracted from the Y scale reading and ez is subtracted from the Z scale reading.

Generally, it is impossible or impractical to measure parametric errors directly along the machine axes. Where measurements are made along other axial direction lines, the following equations are used to calculate parametric errors along the machine axes. Ground rules for deriving the equations are that all parametric errors are zero at the origin and that all measured values are zero at the zero travel position on a measurement line. In transferring the values measured by the calibration system to the machine axes, the following notation is used: B** = a distance or angle measured during machine calibration. The first asterisk is replaced by x, y or z to denote the measurement line and the second asterisk is replaced by d, h, v, y, p or r to denote the kind of measurement.

"d" denotes a linear displacement measurement.

"h" denotes a horizontal straightness measurement. For the z axis, h denotes the x direction.

"v" denotes a vertical straightness measurement. For the z axis, v denotes the y direction.

"y" denotes a yaw measurement. For the x and y axes, yaw is an angular rotation about a vertical axis. For the z axis, it is an angular rotation about the y axis.

"p" denotes a pitch measurement. For x and y, pitch is an angular rotation about a horizontal line perpendicular to the measurement line. For z, it is an angular rotation about the x axis.

"r" denotes an auxiliary straightness measurement for determination of roll. For the x and y axes, the measurement is vertical. For the z axis, the measurement is in the y direction.

P** = a component of distance from the probe reference point to the measurement point (such as the vertex of the retroreflector) in an error measurement. The first asterisk is replaced by x, y or z to denote the measurement line. The second asterisk is replaced by x, y or z to denote the direction of the component.

O* = a coordinate of a line used for measurements. The line defined by two such coordinates is the nominal path of the probe reference point during a set of measurements. The asterisk is replaced by x, y or z to denote the direction of the coordinate.

C = the component of distance between the two straightness measuring lines in a roll measurement. Utilizing the above notation, the values of displacement errors Dij and rotation errors Aik are calculated as follows.

$Axx = (Bxr - Bxv)/C$ $Axy = Bxp$ $Axz = Bxy$ $Ayx = Byp$ $Ayy = (Byv - Byr)/C$ $Ayz = Byy$ $Azx = Bzp$ $Azy = Bzy$ $Azz = (Bzr - Bzv)/C$ $Dxx = X - Bxd + (Oz + Pxz)Axy - Pxy \cdot Axz$ $Dxy = Bxh - X \cdot Ayz - Pxx \cdot Axz + (Oz + Pxz)Axx$ $Dxz = Bxv - Pxy \cdot Axx + Pxx \cdot Axy + X \cdot Ayy$ $Dyx = Byh - (Oz + Pyz)Ayy + Pyy \cdot Ayz$ $Dyy = Y - Byd + (Ox + Pyx)Ayz - (Oz + Pyz)Ayx$ $Dyz = Byv - Pyy \cdot Ayx + (Ox + Pyx)Ayy$ $Dzx = Bzh - Z \cdot Axy - Z \cdot Ayy - Pzz \cdot Azy + Pzy \cdot Azz$ $Dzy = Bzv + Z \cdot Ayx - Pzx \cdot Azz + Pzz \cdot Azx + Z \cdot Axx$ $Dzz = Z - Bzd + Pzy \cdot Azx - Pzx \cdot Azy.$ While there has been shown and described what is at the present considered the preferred embodiments of the present invention, it will be obvious to those skilled in the art that various changes and modifications may be made therein without departing from the scope of the invention as defined by the appended claims.

What is claimed is:

1. Apparatus for measuring position errors in a machine having a first element and a table which are movable in at least two dimensions relative to each other, said apparatus comprising:
   a reflector assembly attachable to said first element;
   a laser measuring assembly attachable to said table for directing at least one outgoing laser beam in a selected measurement direction and for sensing said at least one laser beam reflected from said reflector assembly and generating position error signals representing position errors of said first element; and
   means for mounting said laser measuring assembly to said table in different orientations and for mounting said reflector assembly to said first element in different orientations, said reflector assembly and said measuring assembly being aligned in each of said different orientations so that said at least one outgoing laser beam is reflected said reflector assembly back to said laser measuring assembly.

2. Apparatus for measuring position errors as defined in claim 1 wherein said mounting means comprises a mounting fixture which is attached to said table in a preselected position and which includes means for mounting said laser measuring assembly in each of said different orientations.

3. Apparatus for measuring position errors as defined in claim 1 wherein said mounting means includes means for mounting said laser measuring assembly and said reflector assembly in three mutually orthogonal orientations whereby a set of parametric errors along three mutually orthogonal directions is measured.

4. Apparatus for measuring position errors as defined in claim 3 wherein said machine is a coordinate measuring machine and said first element is a ram movable in three dimensions.

5. Apparatus for measuring position errors as defined in claim 3 wherein said laser measuring assembly and said reflector assembly include first means for measuring displacement errors, second means for measuring straightness errors in two directions perpendicular to said selected direction, third means for measuring pitch and yaw errors representative of rotation about axes perpendicular to said selected direction, and fourth means for measuring roll errors representative of rotation about said selected direction.

6. Apparatus for measuring position errors as defined in claim 5 further including means responsive to said position error signals for calculating a matrix of parametric errors corresponding to each selected position along said selected measurement direction.

7. Apparatus for measuring position errors as defined in claim 6 wherein said machine includes a coordinate measuring machine having a bridge, a carriage and a ram movable in three mutually orthogonal directions and further includes scale devices for monitoring the positions of said bridge, said carriage and said ram.

8. Apparatus for measuring position errors as defined in claim 7 further including means responsive to said parametric errors for calculating total errors for given positions of said bridge, said carriage and said ram and for subtracting said total errors from the readings of said scale devices to provide accurate position information.

9. Apparatus for measuring position errors as defined in claim 5 wherein said second measuring means comprises a retroreflector mounted to said reflector assembly, means for directing a laser beam at said retroreflector from said measuring assembly and a photosensor in said measuring assembly partitioned into quadrants for sensing deviations of the reflected beam from the center thereof.

10. Apparatus for measuring position errors as defined in claim 5 wherein said third measuring means comprises a mirror mounted to said reflector assembly, means for directing a laser beam at said mirror from said measuring assembly and a photosensor located in said measuring assembly partitioned into quadrants for sensing deviations of the reflected beam from the center thereof.

11. Apparatus for measuring position errors as defined in claim 5 wherein said fourth measuring means comprises a pair of retroreflectors spaced apart by a prescribed distance and mounted to said reflector assembly, means for directing individual laser beams at each of said retroreflectors from said measuring assembly, and a pair of partitioned photosensors in said measuring assembly for sensing the deviation of each reflected beam in a direction perpendicular to the selected direction and perpendicular to a line drawn between said pair of retroreflectors, said roll error being proportional to the difference between the deviation sensed by the two photosensors divided by said prescribed distance.

12. In a machine having a first element and a table which are movable in at least two directions relative to each other, a method for measuring parametric errors in the relative positions of the first element and the table comprising the steps of:
   (a) mounting a reflector assembly to the first element in a first reflector orientation and positioning the first element in a first selected position;
   (b) mounting a laser measuring assembly to the table in a first laser orientation aligned with said reflector assembly such that at least one laser beam is directed by said measuring assembly along a selected measurement direction at said reflector assembly and is reflected back to said measuring assembly;
   (c) sensing said at least one laser beam reflected back to said measuring assembly to provide position error signals representing displacement, straightness, pitch, yaw and roll position errors of said first element relative to said table and storing said error signals;
   (d) moving said first element and said reflector assembly in said selected direction to another selected position wherein said reflector assembly is aligned with said at least one laser beam;
   (e) sensing said at least one laser beam reflected back to said measuring assembly to provide position error signals representing displacement, straightness, pitch, yaw and roll position errors of said first element relative to said table and storing said error signals;
   (f) repeating steps (d) and (e) for a number of selected positions in the direction of said at least one laser beam;
   (g) mounting said reflector assembly to the first element in a second reflector orientation;

(h) mounting said laser assembly to the table in a second laser orientation in alignment with said reflector assembly; and (i) repeating steps (c) through (f) for said second orientation.

13. A method for measuring parametric errors as defined in claim 12 further including the steps of (j) mounting said reflector assembly to the first element in a third reflector orientation, said first, second and third reflector orientations being mutually orthogonal;

(k) mounting said laser measuring assembly to the table in a third laser orientation in alignment with said reflector assembly, said first, second and third laser orientations being mutually orthogonal; and (l) repeating steps (c) through (f) for said third orientation.

14. A method for measuring parametric errors as defined in claim 13 further including the step of (m) converting the position error signals for each selected position of said first, second and third orientations into a matrix of parametric errors along three mutually orthogonal directions.

15. A method for measuring parametric errors as defined in claim 14 further including the steps of (n) for a given position of said first element, calculating total position errors thereof from said parametric errors and (o) obtaining scale readings of said machine of the position of the first element relative to the table and subtracting the total errors of said first element from the scale readings of said machine to obtain a corrected position of said first element.

16. In a machine having a first element and a table which are movable in a selected direction relative to each other, apparatus for measuring parametric errors in the relative positions of the first element and the table comprising:

a reflector assembly attachable to said first element and a laser measuring assembly attachable to said table for directing a plurality of laser beams at said reflector assembly and for sensing laser beams reflected from said reflector assembly, said reflector assembly and said laser measuring assembly including first means for measuring displacement errors along the selected direction, second means for measuring straightness errors in two directions perpendicular to the selected direction comprising a retroreflector mounted to said reflector assembly, means for directing a laser beam at said retroreflector from said measuring assembly, and a photosensor in said measuring assembly partitioned into four quadrants for sensing deviations of the reflected beam from the center thereof;

third means for measuring pitch and yaw errors about two mutually orthogonal axes perpendicular to the selected direction comprising a mirror mounted to said reflector assembly, means for directing the laser beam at said mirror from said measuring assembly and a photosensor located in said measuring assembly partitioned into four quadrants for sensing deviations of the reflected beam from the center thereof and fourth means for measuring roll error about the selected direction comprising a pair of retroreflectors spaced apart by a prescribed distance and mounted to said reflector assembly, means for directing individual laser beams at each of said retroreflectors from said measuring assembly, and a pair of partitioned photosensors in said measuring assembly for sensing the deviation of each reflected beam in a direction perpendicular to the selected direction and perpendicular to a line drawn between said pair of retroreflectors, said roll error being proportional to the difference between the deviation sensed by the two photosensors divided by said prescribed distance.

17. Apparatus for measuring parametric errors as defined in claim 16 wherein said laser measuring assembly further includes a laser for generating a laser beam and means for splitting said laser beam into parts supplied to said first measuring means, said second measuring means, said third measuring means and said fourth measuring means.

18. Apparatus for measuring parametric errors as defined in claim 17 wherein said laser beam splitting means include a polarizing beam splitter for polarizing the laser beam so that the reflected portion is polarized perpendicular to the plane of the beam splitter, and the transmitted beam is polarized parallel to the plane of the beam splitter and wherein said third measuring means further includes a quarter wave plate for rotating the plane of polarization of the reflected beam by ninety degrees so the return beam from the mirror passes through the polarizing beam splitter, rather than being reflected back toward the laser.

19. Apparatus for measuring parametric errors as defined in claim 17 further including means for moving said reflector assembly and said first element to selected positions along said selected direction.

20. Apparatus for measuring parametric position errors in a machine having a first element and a second element movable relative to each other, said apparatus comprising:

a first calibration assembly attachable to said first element;

a second calibration assembly attachable to said second element;

interferometer means for measuring change of distance between the first and second calibration assemblies in a selected direction;

means for generating a plurality of laser beams between said first and second calibration assemblies and positionally sensitive to transverse and rotational relative movements of said first and second calibration assemblies;

beam position sensing means responsive to said position-sensitive laser beams for sensing transverse and rotational relative movements of said first and second calibration assemblies; and means responsive to the outputs of said interferometer means and said beam position sensing means for calculating parametric position errors between said first and second elements.

21. Apparatus for measuring parametric position errors in a machine having a first element and a second element movable in at least two directions relative to each other, said apparatus comprising:

a calibration assembly including a first subassembly attachable to said first element and a second subassembly attachable to said second element, said second subassembly including means for directing a plurality of laser beams at said first subassembly, and said first subassembly including means for receiving said plurality of laser beams, said calibration assembly further including sensing means responsive to said plurality of laser beams for providing position error signals representing parametric position errors along said at least two directions of movement, said parametric errors including displacement errors in three mutually perpendicular directions and rotation errors about said three mutually perpendicular directions; and means for mounting said first and second subassemblies so that said plurality of laser beams is successively parallel to said at least two directions of movement so that said sensing means provides said position error signals for said at least two directions of movement.

22. Apparatus for measuring parametric position errors in a machine having a first element and a second element movable in at least two directions relative to each other, said apparatus comprising:

a calibration assembly including a first subassembly attachable to said first element and a second subassembly attachable to said second element, said second subassembly including means for directing at least one laser beam in a selected direction at said first subassembly, and said first subassembly including means for receiving said at least one laser beam, said calibration assembly further including sensing means responsive to said at least one laser beam for providing position error signals representing said parametric position error signals along said at least said two directions of movement, said parametric errors including displacement errors in three mutually perpendicular directions and rotation errors about said three mutually perpendicular directions; and means for mounting said first and second subassemblies so that said at least one laser beam is successively parallel to said at least two directions of movement so that said sensing means provides said position error signals for said at least two directions of movement.

23. Apparatus for measuring parametric position errors as defined in claim 22 wherein said mounting means comprises a mounting fixture which is attached to said second element in a preselected position and which includes means for mounting said second subassembly in each of said different orientations.

24. Apparatus for measuring parametric position errors as defined in claim 22 wherein said mounting means includes means for mounting said first and second subassemblies in three mutually orthogonal orientations whereby a set of parametric errors along three mutually orthogonal directions is measured.

25. Apparatus for measuring parametric position errors as defined in claim 24 wherein said first and second subassemblies include first means for measuring displacement errors, second means for measuring straightness errors in two directions perpendicular to said selected direction, third means for measuring pitch and yaw errors representative of rotation about axes perpendicular to said selected direction and fourth means for measuring roll errors representative of rotation about said selected direction.

26. Apparatus for measuring parametric position errors as defined in claim 22 wherein said machine includes scale devices for measuring the position of said second element relative to said first element and wherein said apparatus further includes means responsive to said position error signals for calculating a matrix of parametric errors corresponding to selected positions along said selected directions of movement and means responsive to said parametric errors for calculating total errors for given positions of said first and second elements and for subtracting said total errors from the readings of said scale devices to provide accurate position information.

27. Apparatus for measuring parametric position errors as defined in claim 25 wherein said second measuring means comprises a retroreflector mounted to one of said subassemblies, means for directing a laser beam at said retroreflector from the other of said subassemblies and a photosensor partitioned into quadrants for sensing deviations from the center thereof of the laser beam reflected from said retroreflector.

28. Apparatus for measuring parametric position errors as defined in claim 25 wherein said third measuring means comprises a mirror mounted to one of said subassemblies, means for directing a laser beam at said mirror from the other of said subassemblies and a photosensor partitioned into quadrants for sensing deviations from the center thereof of the laser beam reflected from said mirror.

29. Apparatus for measuring parametric position errors as defined in claim 25 wherein said fourth measuring means comprises a pair of retroreflectors spaced apart by a prescribed distance and mounted to one of said subassemblies, means for directing individual laser beams at each of said retroreflectors from the other of said subassemblies, and a pair of partitioned photosensors for sensing the deviation of each laser beam reflected from said retroreflectors in a direction perpendicular to the selected direction and perpendicular to a line drawn between said pair of retroreflectors, said roll error being proportional to the difference between the deviation sensed by the two photosensors divided by said prescribed distance.

* * * * *